July 1, 1924.

G. H. FRASER

AIR SEPARATOR

Original Filed Dec. 28, 1915

1,499,723

INVENTOR
George Holt Fraser

Patented July 1, 1924.

1,499,723

UNITED STATES PATENT OFFICE.

GEORGE HOLT FRASER, OF BROOKLYN, NEW YORK.

AIR SEPARATOR.

Continuation of application Serial No. 69,024, filed December 28, 1915. This application filed September 26, 1921. Serial No. 503,159. Renewed November 27, 1923.

*To all whom it may concern:*

Be it known that I, GEORGE HOLT FRASER, a citizen of the United States, residing in the borough of Brooklyn, county of Kings, city and State of New York, United States of America, have invented certain new and useful Improvements in Air Separators, being a continuation of my original application Serial No. 69,024 filed December 28, 1915, renewed March 16, 1921 Serial No. 452,721, of which the following is a specification.

This invention relates to air separators for separating fine from coarse material, and aims to provide certain improvements therein.

Heretofore air separators have comprised a rotating distributing disk, a revolving blower, and an outer dust chamber, the blower drawing the air through the distributed material, so that the dust could settle in the outer chamber and the clean air return to the feed chamber.

This invention provides an annular series of reversely inclined baffle rings below the distributor, between which the material falls from one to another in an annular blanket to afford an extended distribution of the material and retard its descent; it also provides annular deflectors in the path of the outflowing material for selecting from the current coarser particles and returning these to the tailings; it also provides an annular upwardly extending current chamber in which particles too large to float may precipitate; it also provides an annular filter consisting of inclined concave plates or troughs in the return passage for the current, which are staggered to intercept inwardly floating dust; and it also provides an intermediate chamber receiving the fine dust precipitated by these filters for classifying and separating this from the coarser dust collected in the outer dust chamber.

Figure 1:
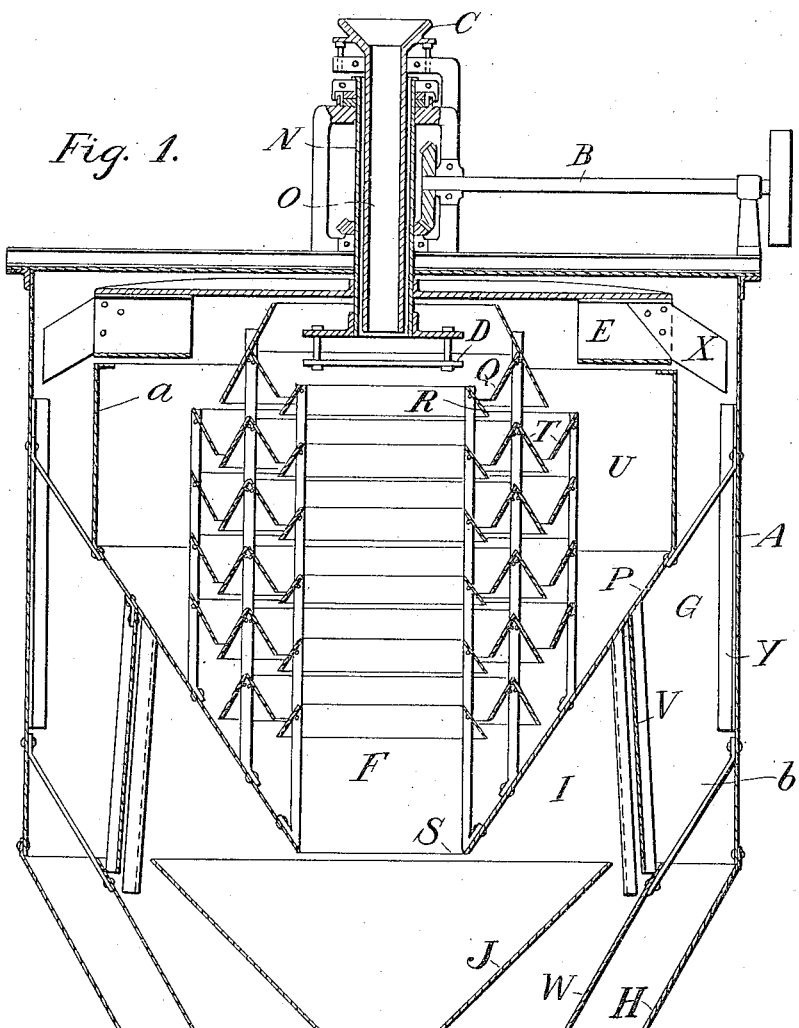
Figure 2:
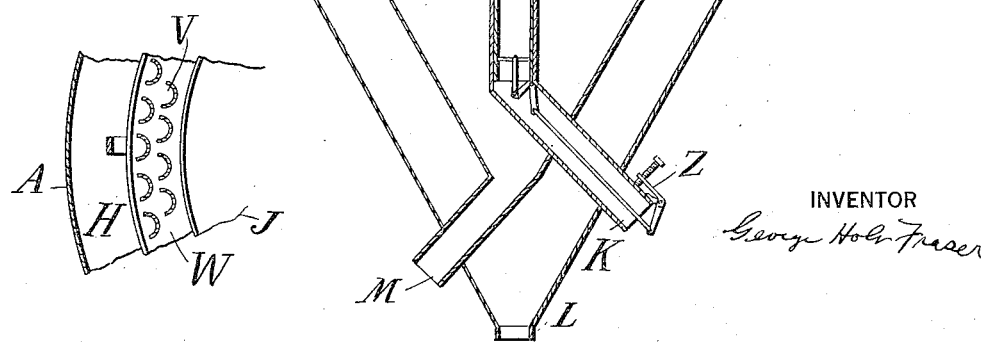

The preferred form of this invention is shown in the accompanying drawings in which Fig. 1 is a vertical axial section of the improved air separators, and Fig. 2 is a fragmentary horizontal section through the filter tubes thereof.

Referring to the drawings A is the casing, B is the driving mechanism, C is the feed hopper, D is the distributor, E is the blower, F is the feed chamber, G is the blast chamber, H is the dust chamber, I is the return passage, J is the tailings cone, K is the tailings outlet, L is the dust outlet, and M is the fine outlet of an air separator.

The casing A is usually cylindrical and conical, with a flat top.

The driving mechanism comprises a tubular shaft N which carries the disk D and surrounds the adjustable feed pipe O. An upper receptacle having upper and lower openings, as the cone P, having a cylindrical upwardly extending outer wall $a$, encloses the feed chamber, and one feature of improvement consists in reversely inclined spaced baffle rings Q and R receiving the material thrown out by the feeder and affording an annular sinuous descending path for the surrounding chamber, so that the material is alternately collected and distributed as it falls from step to step as the current flows outwardly through it to float fine material outward. This affords sufficient area for the current to extract all the fine material, the remainder falling onto the cone P and through the outlet S thereof to the tailings cone J, from which it escapes through the outlet K.

To extract from the outflowing current any large pieces this invention provides annular selecting rings T surrounding the baffle rings and affording a sinuous passage for the outflowing current in which large pieces may precipitate and descend through the spaces between the rings and flow to the outlet S, while the fine material in the current passes into the chamber U which this invention provides surrounding the selectors, and which is a large upwardly extending chamber within the wall $a$ and leading to the blower and in which any remaining large pieces may fall from the current and descend through the cone P, so that only fine material will pass through the blower and descend in the blast chamber G to the precipitation chamber $b$ in which it may precipitate. From this chamber this current will return inwardly through the filter plates or troughs V to the return passage I and upwardly through the aperture S to the feed chamber F. The filter plates or troughs are concave on their outer faces and arranged in two annular rows spaced apart and staggered so that the inner plates or troughs are opposite the apertures between the outer plates or troughs. Dust in the returning current precipitates in the hollow faces of these plates or troughs, and this fine dust slides down the plates or troughs into the dust chamber H, thus cleaning the returning air, but according to one feature of this invention this fine dust is classified separately by providing an additional cone W beneath the plates or troughs which receives their discharge and delivers it through the fine outlet M. All dust precipitating in the blast chamber G falls in the dust chamber H and escapes through the dust outlet L.

The blower has the usual whirling blades X and the casing the usual dust flanges Y.

The regulating damper is provided by the adjustable tailings cone J which is operated by a lever Z.

In operation the material descends in an annular blanket and the current flowing outwardly through it extracts the fines. The selector rings extract large pieces, and the selecting chamber U permits coarse dust to settle, so that only the fine dust reaches the blower and the outer chambers. The chambers H and W classify the outwardly floated dust, and the filter V cleans the returning air.

It will be seen that the invention provides means which can be readily availed of in whole or in part, and that it is not limited to the particular details of construction, combination and use shown as constituting its preferred form, since any usual equivalents may be substituted, and any of the features of improvement may be used independently of other features. For example, the selector rings T or the selector chamber U may be used with one another or independently or with or without the baffle rings, and the fine cone W may be omitted when its classification is not required.

Claims.

1. In combination, a casing, means for causing material to descend therein in a downward path and affording a current passage across said path, current regulating means in advance of said path, means adjacent to said path affording a sinuous current passage successive to and receiving current from said first passage and affording an outlet for precipitated material below said sinuous passage, means successive to said sinuous passage affording an upward current passage receiving and directing upwardly current from said sinuous passage having an upper current outlet above said sinuous passage and a lower precipitate outlet, means affording a settling chamber successive to and receiving current from said upper outlet, and a blower disposed above said upward passage for causing a fluid current to flow across said path through said upward passage through said upper outlet and into said settling chamber.

2. In combination, a casing, means for distributing material therein in a path and affording a current passage across said path, current regulating means in advance of said path, means successive to said path affording an upward current passage receiving and directing current upwardly from said path and affording an upper current outlet and a lower precipitate outlet, means intermediate of said path and said upper outlet intercepting current crossing said path and affording a sinuous current passage for such current and a precipitate outlet beneath said sinuous passage, a settling chamber successive to and receiving current from said upper outlet, and a blower above said upward passage for causing a fluid current to flow across said path through said sinuous passage up through said upward passage and into said settling chamber.

3. In combination, a casing, means for distributing material therein in a path and affording a current passage across said path, current regulating means in advance of said path, means surrounding said path affording an upwardly extending current passage for the current crossing said path and an upper current outlet and a lower precipitate outlet, annular intercepting means disposed intermediate of said path and said upper outlet affording a sinuous current passage for current crossing said path and a precipitate outlet below said sinuous passage, means affording an annular settling chamber successive to said upper outlet and receiving current therefrom through said upper outlet, and a blower above said upward passage for causing a fluid current to flow across said path through said passages and into said settling chamber.

4. In combination, a casing, fixed means for causing material to descend therein in an annular path and affording an outward current passage across said path, current regulating means in advance of said path, annular means outwardly of and surrounding said path and affording an upwardly extending current passage outwardly of said path and an upper current outlet above said current passage and a lower precipitate outlet, means affording an annular settling chamber surrounding said upward passage and receiving current therefrom through said upper outlet, and a blower above said upward passage revolving in said upper outlet for causing a fluid current to flow outwardly across said path upwardly through said upward passage and outwardly into said settling chamber.

5. In combination, a casing, fixed annular means spaced apart causing material to descend between them in a downward path therein and affording an outward current passage across said path, an annular wall outwardly of and surrounding said path and affording an upwardly extending current passage around said means for receiving current crossing said path and having an annular outer current outlet above said means and a lower precipitate outlet, means affording a downward current passage surrounding said wall and communicating with said upper outlet, means affording a settling chamber below and communicating with said downward passage and receiving current therefrom, means affording an annular return passage below and surrounding said wall communicating with said settling chamber and with said lower outlet for returning current from said chamber to the inner side of said path, means for varying the space through said annular return passage through which current is permitted to flow, means affording a lower wall for said return passage, and a blower above said upward passage revolving in said outer outlet for causing a fluid current to flow across said path and through said passages.

6. In combination, a casing, means for distributing material therein in a path and affording a current passage across said path, means at one side of said path affording a current passage for the current crossing said path and having an upper current outlet and a lower precipitate outlet, means affording a settling chamber successive to and receiving current from said upper outlet and having an upper return outlet and a wall below said return outlet and separating the lower part of said settling chamber from said return outlet, vertically adjustable means below said current passage and above said wall affording a return passage communicating between said outlet and the other side of said path and disposed intermediate of the latter and said wall, and means for causing a fluid current to flow across said path through said passage to said settling chamber through said return outlet and through said return passage to the other side of said path.

7. In combination, a casing, means for causing material to descend therein in a downward path comprising reversely inclined superposed baffles or faces spaced apart and affording between them a downwardly extending material conduit or way and an outwardly extending sinuous current passage, current regulating means in advance of said path, means at the side of said baffles or faces affording an upwardly extending current passage receiving current from said sinuous passage and an upper current outlet above said sinuous passage, a blower above said sinuous passage for causing a fluid current to flow across said path outwardly through said sinuous passage and upwardly to said outlet, and a settling chamber communicating with and receiving current from said outlet.

8. In combination, a casing, means for causing material to descend therein in a downward path comprising a plurality of opposed baffles or faces spaced apart and affording between them a downwardly extending material conduit and an outwardly extending current passage, selecting means at the side of said path comprising reversely inclined members or faces superposed and spaced apart and affording between them an outwardly extending sinuous passage and affording an outlet for precipitated particles below an intermediate part of said passage, means affording an upwardly extending passage communicating with said sinuous passage at the other side of said selecting means and affording an upper current outlet above said sinuous passage, a blower above said sinuous passage for causing a fluid current to flow outwardly across said path and through said sinuous passage and upwardly through said outlet, means for varying the space through which said current is permitted to flow, and a settling chamber communicating with and receiving fluid current from said current outlet.

9. In combination, a casing, means for distributing material therein in a path and affording a current passage across said path, means at one side of said path affording an outward current passage receiving current from said current passage and having an upper current outlet and a lower precipitate outlet, means affording a settling chamber successive to and receiving current from said current outlet and having a return current outlet, means affording a pervious wall for extracting fine material from the current traversing said return current outlet, means affording a return passage communicating between said return current outlet and the other side of said path, adjustable means below said return current passage for varying the space therein through which current is permitted to flow, means affording a wall between said settling chamber and said adjustable means, and means for causing a fluid current to flow across said path through said current passage into said settling chamber through said return outlet and through said return passage to the other side of said path.

10. In combination, a casing, means for causing material to descend therein in an annular downward path affording an outward current passage across said path, selecting means surrounding said annular path affording an annular outwardly extending current passage receiving current passing said path, means surrounding said selecting means affording an upwardly extending annular current passage receiving current passing said selecting means and affording an upper current outlet, a blower above said selecting means for causing a fluid current to flow outwardly therethrough, and upwardly through said current passage to said outlet, means affording an annular settling chamber surrounding said parts and receiving current from said outlet, means affording a return passage for current from said settling chamber to the space inwardly of said path, and means for varying the space in said return passage through which current is permitted to flow.

11. In combination, a casing means for distributing material therein in an annular path and affording a current passage across said path, means surrounding said path affording an outwardly extending current passage for the current crossing said path and affording an upper current outlet and a lower precipitate outlet, means surrounding said upper outlet affording a downward current passage for receiving current therefrom, means below said downward passage affording an annular settling chamber having an inner return outlet, means affording an annular return current passage communicating between said return outlet and the other side of said path, adjustable means below said return passage for varying the space therein through which current is permitted to flow, means affording an annular wall for said settling chamber around said adjustable means and inwardly of said settling chamber and separating the latter from said return passage below said return outlet, and means for causing a fluid current to flow across said path through said outward and downward passages through said return outlet and through said return passage to the other side of said path.

12. In combination, a casing enclosing a chamber, means for distributing material therein, an upper receptacle in spaced relation to said casing having an upper opening and a lower opening, a lower receptacle adjustable relatively to said upper receptacle and having an upper opening affording a current passage between said receptacles and communicating with the lower opening of said upper receptacle and having a lower outlet for coarse material, means for causing a fluid current to flow through and around said upper receptacle and into said chamber, and a fixed wall in said chamber between said lower receptacle and the outer wall of said casing affording an outer dust chamber and an inner chamber for said lower receptacle.

13. In combination, a casing enclosing a chamber, an upper receptacle therein having an upper opening and a lower opening, means for feeding material to be separated to said upper receptacle, an adjustable lower receptacle in said casing having an upper opening communicating with the lower opening of said upper receptacle and affording a current passage thereto and having a lower outlet for coarse material, means for causing a fluid current to flow through and around said upper receptacle, into said chamber and return between said receptacles, means surrounding said lower receptacles and in the path of said current for extracting fluid particles from said current, and a fixed wall within and in spaced relation to said casing below said lower receptacle and below said extracting means affording a chamber below said extracting means for material precipitated thereby and affording a chamber without said extracting means for material precipitated outwardly of the latter.

14. In combination, a casing enclosing a chamber, an upper receptacle mounted in said chamber and having upper and lower openings communicating therewith, a lower receptacle within said chamber having an open upper part affording communication between said chamber and said lower opening, means for supplying material to be separated to said upper receptacle, means for causing a fluid current to flow through said upper receptacle and upper opening to said chamber and return between said receptacles to said lower opening, means in the path of such current for intercepting and conducting out of the current zone particles floating in such current, means in said lower receptacle for varying the space through which such current may flow, and means below said intercepting means for adjusting said varying means from without said casing.

15. In combination, a casing enclosing a chamber, an upper receptacle mounted in said chamber and having upper and lower openings communicating therewith, a movable lower receptacle within said chamber having an open upper part affording communication between said chamber and said lower opening, means for supplying material to be separated to said upper receptacle, means for causing a fluid current to flow through said upper receptacle and upper opening to said chamber and return between said receptacles to said lower opening, means in the path of such current for intercepting and conducting out of the current zone particles floating in such current, and means extending without said casing below said intercepting means communicating with said lower receptacle for moving it to vary the space through which such current may flow.

16. In combination, a casing enclosing a chamber, an upper receptacle mounted in said chamber and having a large upwardly extending portion affording an upward current passage and contracted upper and lower openings communicating between said portion and said chamber, a stationary lower receptacle within said chamber having an open upper portion affording communication between said chamber and said lower opening, means for supplying material to be separated to said upper receptacle, means for causing a fluid current to flow through said upper receptacle and upper opening to said chamber and return between said receptacles to said lower opening, and means in the path of such current for intercepting and conducting out of the current zone particles floating in such current.

In witness whereof, I have hereunto signed my name in the presence of two subscribing witnesses.

GEORGE HOLT FRASER.

Witnesses:
EDMUND J. FENN,
JOSEPH P. TIGHE.